United States Patent [19]
Ting

[11] Patent Number: 6,102,553
[45] Date of Patent: Aug. 15, 2000

[54] PALM-SIZE PROJECTOR LIGHT WITH ANNULAR LENS AND ROTATABLE ADJUSTMENT RING FOR CHANGING PATTERNS OF EMITTED LIGHT

[75] Inventor: Chih-Yu Ting, Taipei, Taiwan

[73] Assignee: Opcom Inc., Taipei, Taiwan

[21] Appl. No.: 09/030,543

[22] Filed: Feb. 26, 1998

[51] Int. Cl.[7] .................................................. F21K 27/00
[52] U.S. Cl. .......................... 362/259; 362/277; 362/293; 362/282; 362/187; 362/311; 353/101; 353/117; 353/110
[58] Field of Search .................................... 362/259, 277, 362/293, 282, 187, 311; 353/101, 117, 110

[56] References Cited

U.S. PATENT DOCUMENTS

| | | | |
|---|---|---|---|
| 5,690,418 | 11/1997 | Hsiung | 362/259 |
| 5,697,700 | 12/1997 | Huang | 362/259 |
| 5,788,359 | 8/1998 | Halsey et al. | 362/259 |
| 5,791,766 | 8/1998 | Lee | 362/259 |
| 5,803,582 | 9/1998 | Hunag | 362/259 |

*Primary Examiner*—Sandra O'Shea
*Assistant Examiner*—Ronald E. DelGizzi
*Attorney, Agent, or Firm*—A & J

[57] ABSTRACT

A palm size laser indicator disk capable of adjusting the shapes of light emitted therefrom includes an adjustment ring, a disk cover, a disk, an annular lens, a laser generating component, and a plurality of connecting screws. By turning the adjustment ring, one of a plurality of patterns of high transparency and different shapes may be caused to be penetrated by the laser light to generate different light shapes.

5 Claims, 3 Drawing Sheets

PALM-SIZE PROJECTOR LIGHT WITH ANNULAR LENS AND ROTATABLE ADJUSTMENT RING FOR CHANGING PATTERNS OF EMITTED LIGHT

BACKGROUND OF THE INVENTION

1. Field of the Invention

The present invention relates to a laser light pen, and more particularly to a palm size laser indicator, which is capable of adjusting the shapes of light emitted therefrom.

2. Description of the Prior Art

In this age of information explosion, there are all kinds of seminars and presentations. During seminars, projectors are often used to project information on a screen. In such cases, the light has to be turned off so that the information shown on the screen can be clearly seen. If the lecturer or presenter wishes to point at a certain portion of the information shown, he/she has to use a laser light pen which emits a ray of light onto the screen to indicate the relation portion. However, with conventional light pens, they can only form a dot of light on the screen. The shape of the light emitted from the light pen on the screen is not adjustable to indicate the different degrees of importance the lecturer or presenter wishes to give to certain portions of the information shown on the screen.

SUMMARY OF THE INVENTION

The present invention relates to a laser light pen, and more particularly to a palm size laser indicator, which is capable of adjusting the shapes of light emitted therefrom.

A primary object of the present invention is to provide a palm size laser indicator disk which allows adjustment of the shape of the light emitted therefrom, in which a lens is disposed at a suitable position in front of where the laser light is emitted, the lens having high transparency and engraved with patterns of different shapes. By turning an adjustment ring, one of the patterns may be caused to be penetrated by the laser light to generate a different shape of light. Thus, various shapes of light may be emitted by the laser indicator disk of the present invention to give different degrees of importance or prominence to the information shown on the screen during seminars, presentations, etc.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
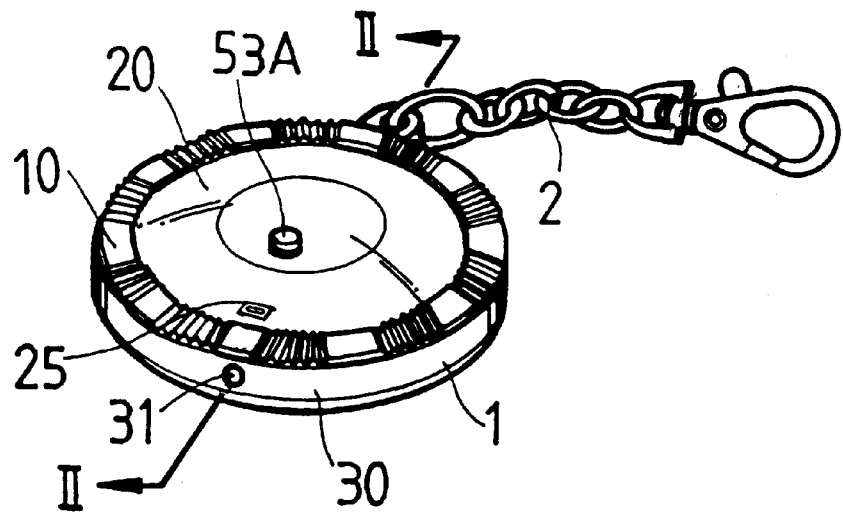
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

FIG. 1 illustrates the palm size laser disk indicator of the present invention. It can be seen that the laser indicator disk 1 is substantially is disk shape structure and a key ring 2 may be attached thereto to facilitate carrying.

Figure 2:
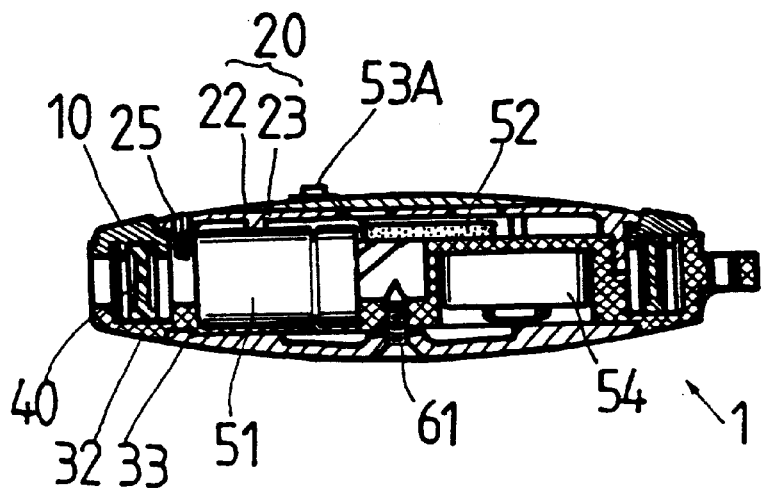
FIG. 2 is a sectional view taken along line II—II of FIG. 1.
Figure 3:
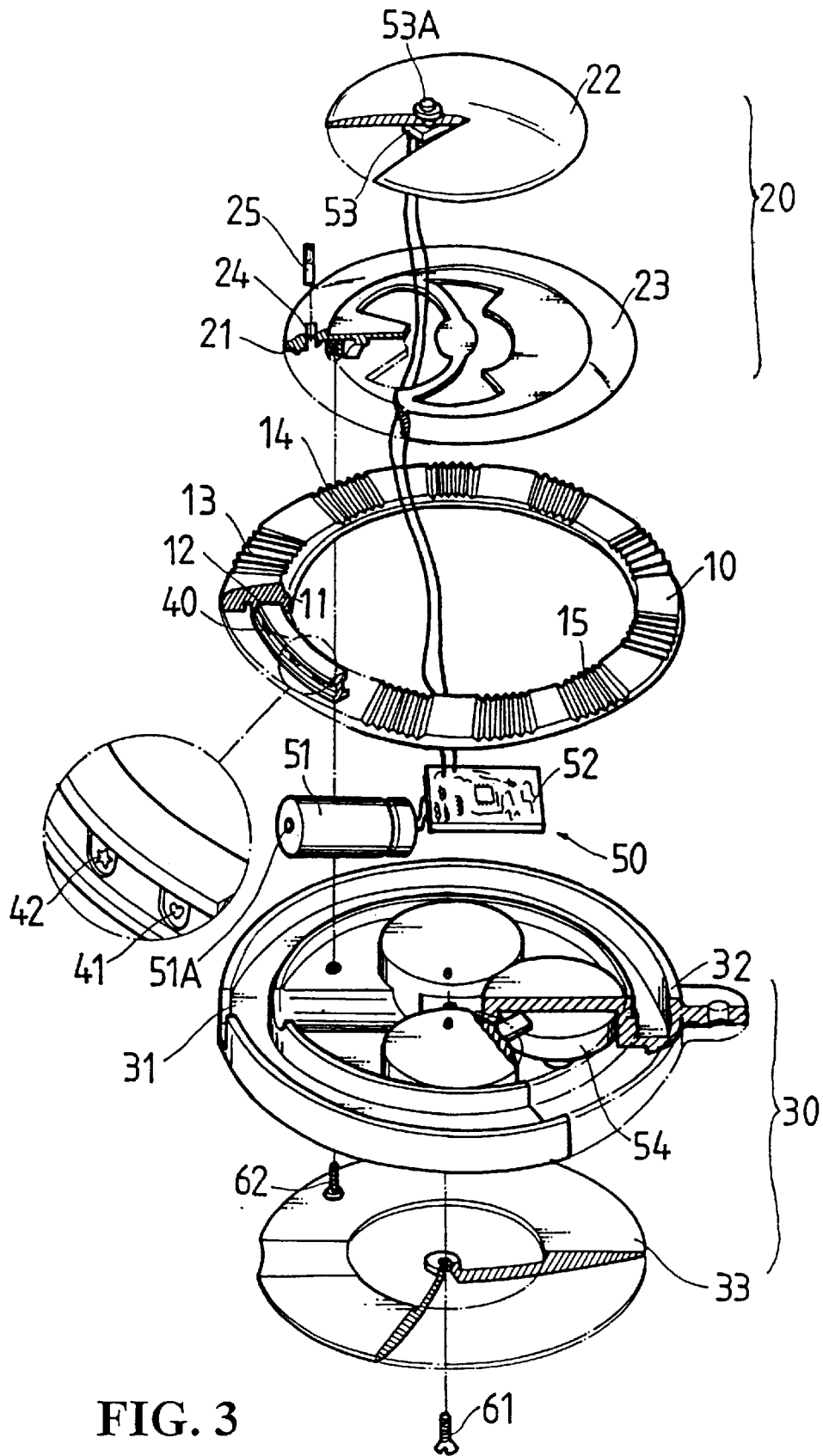
FIG. 3 is a perspective exploded view of the present invention.

FIGS. 2 and 3 show the detailed structure of the present invention. The laser indicator disk 1 comprises: an adjustment ring 10, a disk cover 20, a disk 30, an annular lens 40, a laser generating component 50, and a plurality of connecting screws 61. The rim of the disk 30 is fitted with the adjustment ring 10, which has a plurality of pointed teeth 13 distributed thereon. An inner annular wall 11 projects from the bottom of an inner rim of the adjustment ring 10. The disk cover 20 covers the inner rim of the adjustment ring 10, with a cover rim 21 urging against the inner annular wall 11 and screws 61, . . . Passing through the disk 30 and the disk cover 20 to lock them together, so that the adjustment disk 10 is sandwiched between the disk cover 20 and the disk 30 such that the adjustment ring 10 may be turned at the outer periphery of the disk cover 20. The laser generating component 50 is disposed between the disk 30 and the disk cover 20 and includes a laser generator 51, a control circuit board 52, a switch 53, and at least one battery 54. The switch 53 has a control portion 53A exposing on the disk cover 20. The disk 30 is provided with a through hole 31 at its periphery wall corresponding to an emitting end 51A of the laser generator 51 so that the laser light can be emitted through the disk 30. The disk cover 20 is provided with an observation hole 24 having an observation sleeve 25 insertably provided therein, whereby the laser light emitted may be observed. An annular clamp groove 12 is further provided at a lower end of the adjustment ring 10 to insertably secure the annular lens 40. Patterns 41, 42, . . . of different shapes and high transparency are formed on the surface of the annular lens 40 at suitable positions. After the adjustment ring 10 is coupled to the disk 30, the surface of the annular lens 40 is in front of the emission end 51A. The adjustment ring 10 is rotatable to cause any one of the patterns to be penetrated by the laser light to generate different shapes of light. In order to facilitate manufacture, the disk cover 20 may comprise an upper cover 22 and a lower cover 23, which may be adhered together to form the disk cover, whereas the disk 30 may comprise a disk body 32 and a disk bottom 33 screwably locked together as a whole.

Figure 4:
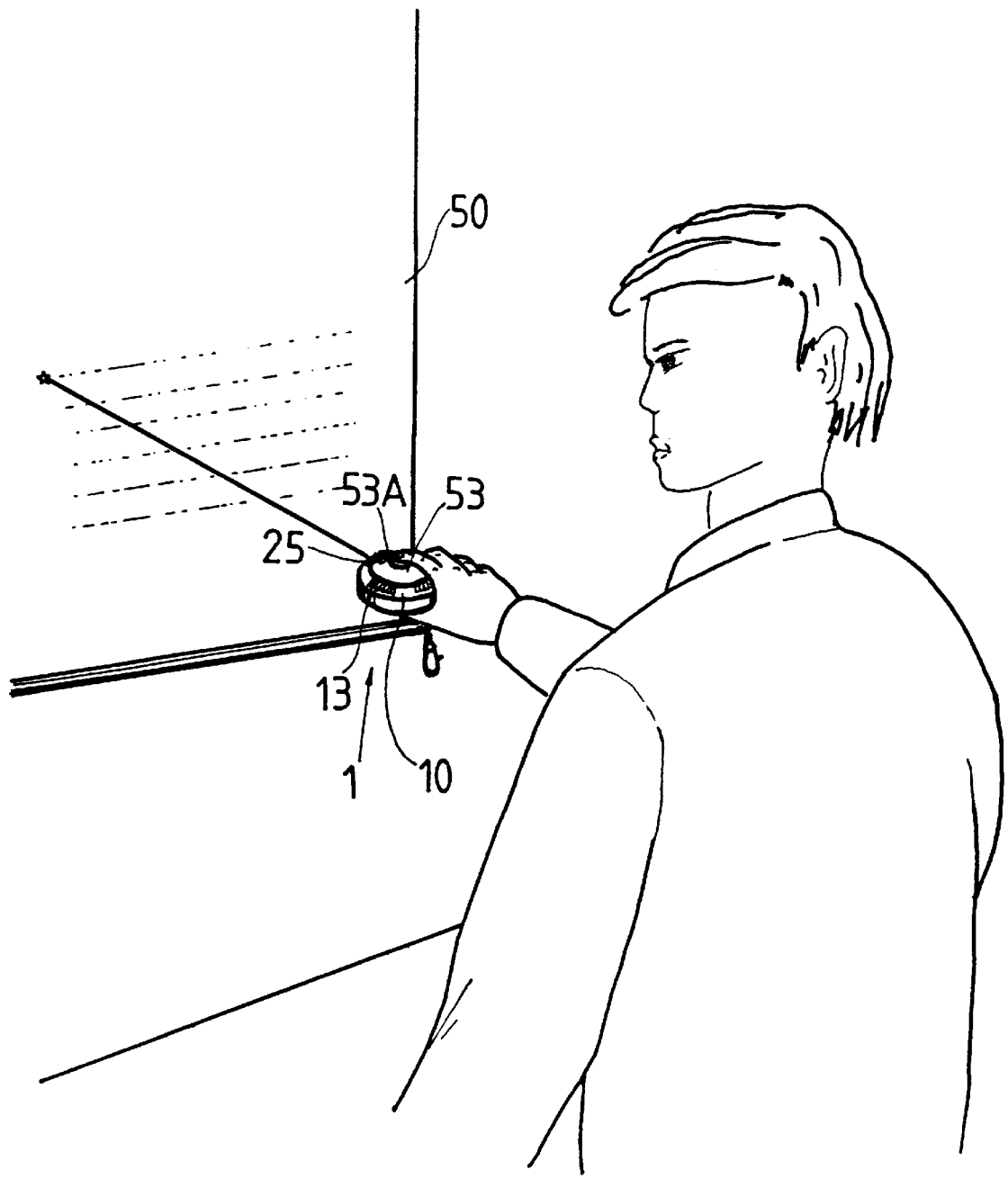
FIG. 4 is a schematic view illustrating operation of the present invention.

In use, referring to FIG. 4, the user presses the control portion 53A of the switch 53 so that a laser light is projected onto a screen 500. By pushing the teeth 13 (so that disclosure tracks with Applicant's drawing changes as noted in changed FIG. 3 on the adjustment ring 10, the adjustment ring 10 may be rotated with ease to cause the laser light to penetrate through any one of the patterns on the annular lens 40 to that the shape of the light on the screen 50 may be varied to give different degrees of importance to relevant portions of the information shown on the screen 50. The user may also observe the laser light through the observation sleeve 25.

From the foregoing, it can be appreciated that the present invention provides various adjustable light shapes to aid a lecturer or presenter to give different degrees of importance to information shown on the screen during a seminar or the like.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A palm-size laser projector light with annular lens and rotatable adjustment ring for changing patterns of emitted light comprising an adjustment ring, a disk cover, a disk, an annular lens, a laser generating component, and a plurality of connecting screws, wherein said adjustment ring is fitted at a disk rim of said disk and has an inner annular wall projecting from the bottom of an inner rim thereof, said disk cover covering the inner rim of said adjustment ring with a rim thereof urging against said inner annular wall, said screws being passed through said disk and said disk cover to lock them together so that said adjustment ring is sandwiched between said disk cover and said disk and is turnable at an outer periphery of said disk cover, said laser generating component being disposed between said disk and said disk cover and including a laser generator, a control circuit board, a switch, and at least one battery, said switch having a control portion exposed on said disk cover, said disk being formed with a through hole at a peripheral wall thereof to correspond to an emitting end of said laser generator so that laser light may emit from said disk, said annular lens being fixedly disposed at a lower end of said adjustment ring and being formed with a plurality of patterns of high transparency and different shapes, whereby after said adjustment ring is coupled to said disk, said annular lens is in front of said emitting end of said laser generator, and by turning said adjustment ring, any one of said patterns may be caused to be penetrated by the laser light to thereby obtain various light shapes.

2. The palm-size laser projector light as defined in claim 1, wherein said adjustment ring is formed with an annular clamp groove at a lower end thereof for insertably securing said annular lens.

3. The palm-size laser projector light as defined in claim 1, wherein said adjustment ring has a plurality of pointed teeth distributed on its surface.

4. The palm-size laser projector light as defined in claim 1, wherein said disk cover may include an upper cover and a lower cover adhered together, and said disk may include a disk body and a disk bottom screwably locked as a whole.

5. The palm-size laser projector light as defined in claim 1, wherein said disk cover is formed with an observation hole at a position corresponding to the front of said emitting end of said laser generator, said observation hole having an observation sleeve insertably provided therein.

* * * * *